United States Patent
Yang et al.

(10) Patent No.: US 11,781,576 B2
(45) Date of Patent: Oct. 10, 2023

(54) CONNECTION AND SEPARATION DEVICE DRIVEN BY MEMORY ALLOY WIRES

(71) Applicant: Harbin Institute of Technology, Harbin (CN)

(72) Inventors: Fei Yang, Harbin (CN); Honghao Yue, Harbin (CN); Chao Ma, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 528 days.

(21) Appl. No.: 17/139,044

(22) Filed: Dec. 31, 2020

(65) Prior Publication Data
US 2021/0123465 A1    Apr. 29, 2021

(30) Foreign Application Priority Data
Mar. 30, 2020    (CN) .......................... 2020102374527

(51) Int. Cl.
| F16B 1/00 | (2006.01) |
| F16B 2/10 | (2006.01) |
| F16B 7/04 | (2006.01) |

(52) U.S. Cl.
CPC .......... *F16B 7/0406* (2013.01); *F16B 1/0014* (2013.01); *F16B 2/10* (2013.01)

(58) Field of Classification Search
CPC ......... B64G 1/64; B64G 1/645; Y10S 403/04; Y10T 403/21; Y10T 403/593; F16B 2/10; F16B 1/0014
See application file for complete search history.

(56) References Cited

U.S. PATENT DOCUMENTS

| 4,929,135 A | * | 5/1990 | Delarue ................ B64G 1/645 |
| | | | 102/378 |
| 5,695,306 A | * | 12/1997 | Nygren, Jr. ........... F15B 15/261 |
| | | | 411/433 |

(Continued)

FOREIGN PATENT DOCUMENTS

| CN | 102910299 A | * | 2/2013 |
| CN | 103231813 A | * | 8/2013 |

*Primary Examiner* — Michael P Ferguson
*Assistant Examiner* — Zachary A Hall
(74) *Attorney, Agent, or Firm* — IPRO, PLLC; Na Xu

(57) ABSTRACT

The disclosure provides a connection and separation device driven by memory alloy wires, including an active end and a passive end. The active end includes a housing, an outer sleeve, fixed sheets, compression springs, a rotating sleeve, a base, memory alloy wires, guide wheels, a lock pin, a limiting sleeve I and a limiting sleeve II. The passive end includes a screw rod, a loading nut, a separation element and an adaptor. The upper end of the screw rod is provided with a threaded section matched with the loading nut, and the lower end of the screw rod is provided with multi-layer oblique protrusions. The multi-layer oblique protrusions extend into the upper part of an accommodating space formed by the limiting sleeve I and the limiting sleeve II. The memory alloy wires are shortened when being electrified, the base and the lock pin move up, the lock pin releases the limit on the lower ends of the limiting sleeve I and the limiting sleeve II, the two limiting sleeves rotate at the same time, the lower parts of the limiting sleeve I and the limiting sleeve II are folded, and the upper parts of the limiting sleeve I and the limiting sleeve II are opened and separated from the screw rod, so as to realize the separation of the active end and the passive end. The disclosure realizes quick separation and has the advantages of no impact, energy saving and environmental protection, small size, high reliability and reusability.

10 Claims, 5 Drawing Sheets

(56) References Cited

U.S. PATENT DOCUMENTS

| | | | | |
|---|---|---|---|---|
| 5,771,742 A | * | 6/1998 | Bokaie | E05B 47/0009 337/140 |
| 6,311,930 B1 | * | 11/2001 | Hersh | B64G 1/222 294/82.26 |
| 6,450,725 B1 | * | 9/2002 | Roth | B64G 1/222 403/28 |
| 7,806,427 B2 | * | 10/2010 | Rudduck | F16B 5/0657 280/728.2 |
| 7,854,580 B2 | * | 12/2010 | Rudduck | F16B 21/186 411/909 |

* cited by examiner

CONNECTION AND SEPARATION DEVICE DRIVEN BY MEMORY ALLOY WIRES

TECHNICAL FIELD

The disclosure belongs to the technical field of aerospace, and particularly relates to a connection and separation device driven by memory alloy wires.

BACKGROUND

The connection and separation release technology is a key technology in the technical fields of aerospace weapons and space delivery. A traditional quick-response connection and separation device is usually a pyrotechnic device, but the pyrotechnic device has the problems including poor safety, large load impact, inability to perform repeated detection, and easy generation of redundant objects or polluted gases after detonation. With the advancement of tasks including national defense aero weapon equipment, aero lunar exploration projects and construction of future space stations, the features including low or even no impact, energy saving and environmental protection, small size, high reliability and reusability have become the new development direction of the connection and separation technology, which is a technical problem that needs to be solved in this field.

SUMMARY

Based on the above, the disclosure aims to provide a connection and separation device driven by memory alloy wires, which realizes quick separation and has the advantages of no impact, energy saving and environmental protection, small size, high reliability and reusability.

In order to achieve the above objective, the technical solution of the disclosure is implemented as follows:

A connection and separation device driven by memory alloy wires includes an active end and a passive end; the active end includes a housing, an outer sleeve, fixed sheets, compression springs, a rotating sleeve, a base, memory alloy wires, guide wheels, a lock pin, a limiting sleeve I and a limiting sleeve II;

the outer sleeve is fixedly arranged in the housing coaxially, the limiting sleeve I, the limiting sleeve II, the fixed sheets, the guide wheels and the lock pin are all arranged in the outer sleeve, the limiting sleeve I and the limiting sleeve II are arranged at the middle part of the outer sleeve, and the openings of the limiting sleeve I and the limiting sleeve II are arranged relative to each other to enclose an accommodating space; a fixed sheet is fixedly arranged on each of two sides of the outer sleeve, a guide wheel is installed on each fixed sheet through a pin shaft, and a connecting line of center shafts of the two guide wheels is perpendicular to a connecting line of the limiting sleeve I and the limiting sleeve II spatially; the top of the lock pin extends into the outer sleeve from the bottom end of the outer sleeve, and the lock pin is slidably arranged in the outer sleeve; the bottom ends of the limiting sleeve I and the limiting sleeve II extend into a hole in the middle of the lock pin, and the lock pin circumferentially restricts the lower parts of the limiting sleeve I and the limiting sleeve II;

the base is fixed at the bottom of the lock pin, a memory alloy wire is wound on each guide wheel, and two ends of each memory alloy wire pass through the lock pin and then are fixed on the base; the lock pin is sleeved with the rotating sleeve, the outer surface of the lock pin is provided with a spiral groove, and correspondingly, the inner wall of the rotating sleeve is provided with a protrusion matched with the spiral groove; when the lock pin moves up and down, the rotating sleeve rotates forward and backward; a compression spring is arranged between the upper surface of the lock pin and a fixed sheet, and the compression springs keep the lock pin in a locked state;

the passive end includes a screw rod, a loading nut, a separation element and an adaptor; the adaptor is fixed on the separation element coaxially, the upper end of the screw rod is provided with a threaded section matched with the loading nut, the lower end of the screw rod is provided with multi-layer oblique protrusions, and the multi-layer oblique protrusions are arranged symmetrically along an axis of the screw rod; the multi-layer oblique protrusions at the lower end of the screw rod sequentially pass through a through hole at the center of the adaptor, a through hole at the upper end of the housing and a through hole at the upper end of the outer sleeve, and then extend into the upper part of an accommodating space formed by the limiting sleeve I and the limiting sleeve II; and the memory alloy wires are shortened when being electrified, the base and the lock pin move up, the lock pin releases the limit on the lower ends of the limiting sleeve I and the limiting sleeve II, the limiting sleeve I and the limiting sleeve II rotate at the same time, the lower parts of the limiting sleeve I and the limiting sleeve II are folded, and the upper parts of the limiting sleeve I and the limiting sleeve II are opened and separated from the screw rod, so as to realize the separation of the active end and the passive end.

Further, the accommodating space formed by the limiting sleeve I and the limiting sleeve II includes an oblique groove section matched with the multi-layer oblique protrusions at the tail end of the screw rod, a flaring groove section and a straight groove section sequentially from top to bottom, and the oblique groove section and the flaring groove section are separated through a rotating hinge; the rotating hinge is formed by mutual cooperation of a semi-circular groove arranged on the limiting sleeve I and a semi-circular protrusion arranged on the limiting sleeve II; two limiting hooks are arranged at the lower part of the limiting sleeve I in parallel, a limiting hook is arranged at the lower part of the limiting sleeve II, and a gap for accommodating the limiting hook of the limiting sleeve II is formed between the two limiting hooks of the limiting sleeve I; and the lock pin limits the swing of the three limiting hooks.

Further, an oblique block is installed at the upper end of the lock pin through an optical axis, the oblique block is arranged in the space at the lower part of the rotating hinge of the limiting sleeve I and the limiting sleeve II, and the optical axis passes through the space at the lower part of the rotating hinge of the limiting sleeve I and the limiting sleeve II.

Further, a bottom cover is installed below the base, the bottom cover is in threaded connection with an electrical connector, a bottom sealing hood is arranged on the bottom cover and the rotating sleeve, and the bottom sealing hood is in threaded connection with the lower end of the housing.

Further, one end of each memory alloy wire is fixed on the base through a wiring terminal, and the two wiring terminals of the two memory alloy wires are both connected to the electrical connector through electrical wires.

Further, two reeds for enabling the limiting sleeve I and the limiting sleeve II to rotate are fixedly arranged on the outer sleeve, and each reed is arranged on the outer side of the corresponding limiting sleeve.

Further, a spherical pad is arranged at the contact position of the adaptor and the loading nut, and the spherical pad is sleeved on the screw rod; a screw rod gasket is sleeved on the screw rod at the bottom of the adaptor; and an upper sealing cover is arranged on the adaptor and the loading nut, and a sealing ring is arranged on the circumferential contact surface of the upper sealing cover and the loading nut.

Further, the rotating sleeve has a reset identification point, the housing also has a reset identification point, and the rotating sleeve can be rotated until the reset identification point on the rotating sleeve coincides with the reset identification point on the housing, so as to reset the active end and the passive end.

Further, a bottom sealing ring is sleeved on the electrical connector between the bottom cover and the bottom sealing hood.

Further, a thin nut for preventing loosening is added to the upper part of the loading nut.

Compared with the prior art, the connection and separation device driven by memory alloy wires, provided by the disclosure, has the following advantages:

(1) The connection and separation device of the disclosure has the characteristics of large load and low impact, and the memory alloy is used as a driving source for an unlocking driving device, so that the unlocking trigger impact is reduced from the driving source, so as to realize the unlocking of small trigger driving force to large pre-tightening force, realize non-ejection separation and reduce the impact.

(2) Memory alloy driving is used in the connection and separation device of the disclosure, compared with an existing pyrotechnic connection and separation device, the memory alloy wire driving source of the disclosure can be used repeatedly, and compared with an electro-mechanical transmission mechanism, the memory alloy wire driving source of the disclosure has smaller size and mass.

(3) An arc pad is installed on a passive end bearing element to ensure the reliability of the pre-tightening force direction when the screw rod is loaded, at the same time, the oblique protrusions of the screw rod are in contact with the limiting sleeve I and the limiting sleeve II to generate unlocking separation, and reliable separation is ensured in combination with the redundant drive of separation reeds, so that the connection and separation device of the disclosure has high reliability.

(4) All kinematic pairs of the active end and the passive end are provided with sealing rings which are waterproof and dustproof and can withstand harsh environments.

(5) The connection and separation device of the disclosure is convenient to reuse and does not need to be disassembled integrally, and only the rotating sleeve needs to be rotated reversely to the identification point.

BRIEF DESCRIPTION OF FIGURES

The Figures forming part of the disclosure are used to provide a further understanding of the disclosure. The explanatory examples of the disclosure and the description thereof are used to explain the disclosure, and do not constitute an improper limitation on the disclosure. In the Figures.

Figure 1:
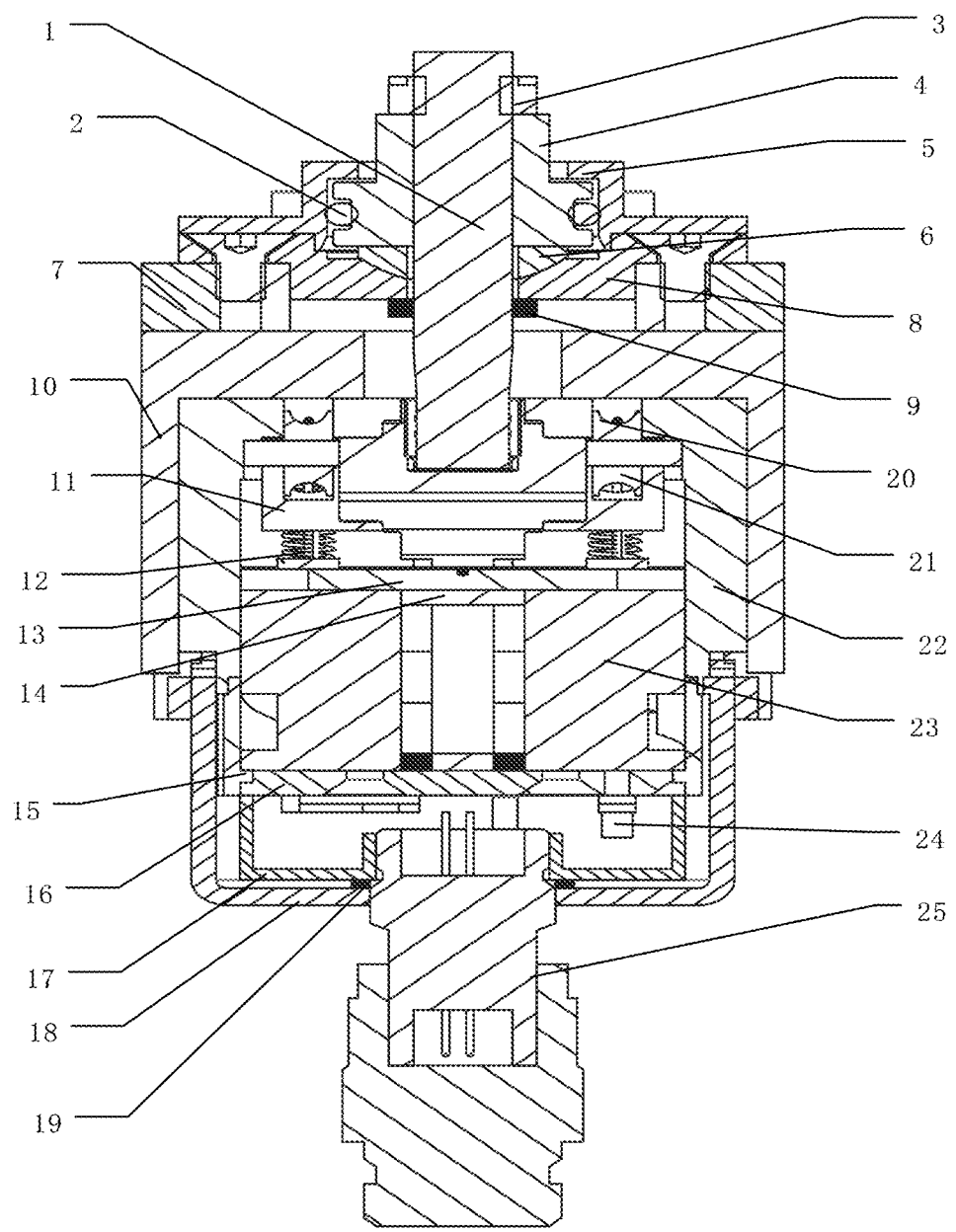
FIG. 1 is a cross-sectional diagram of a connection and separation device driven by memory alloy wires according to the examples of the disclosure.

LIST OF REFERENCE NUMERALS 1 denotes a screw rod, 2 denotes a sealing ring, 3 denotes a thin nut, 4 denotes a loading nut, 5 denotes an upper sealing cover, 6 denotes a spherical pad, 7 denotes a separation element, 8 denotes an adaptor, 9 denotes a screw rod gasket, 10 denotes a housing, 11 denotes a fixed sheet, 12 denotes a spring, 13 denotes an optical axis, 14 denotes an oblique block, 15 denotes a rotating sleeve, 16 denotes a base, 17 denotes a bottom cover, 18 denotes a bottom sealing hood, 19 denotes a bottom sealing ring, 20 denotes a memory alloy wire, 21 denotes a guide wheel, 22 denotes an outer sleeve, 23 denotes a lock pin, 24 denotes a wiring terminal, 25 denotes an electrical connector, 26 denotes a limiting sleeve I, 27 denotes a limiting sleeve II, 28 denotes a reed, 29 denotes a multi-layer oblique protrusion, 30 denotes an oblique groove section, 31 denotes a flaring groove section, 32 denotes a straight groove section, 33 denotes a semi-circular groove, 34 denotes a semi-circular protrusion, 35 denotes a limiting hook, 36 denotes a spiral groove, 37 denotes a protrusion.

DETAILED DESCRIPTION

It should be noted that in the case of no conflict, the examples in the disclosure and the features in the examples may be combined with each other.

The disclosure will be described in detail below with reference to the Figures and in conjunction with the examples.

Figure 2:
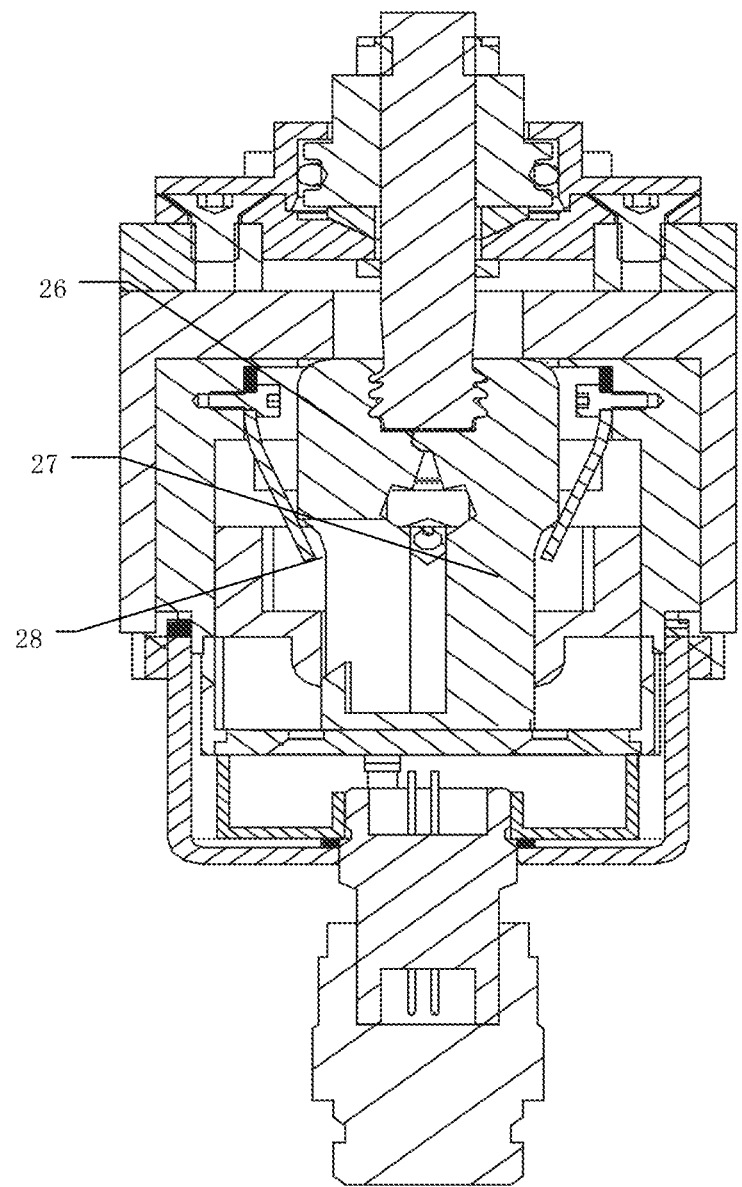
FIG. 2 is a cross-sectional diagram of the connection and separation device in FIG. 1 after being rotated by 90°.
Figure 3:
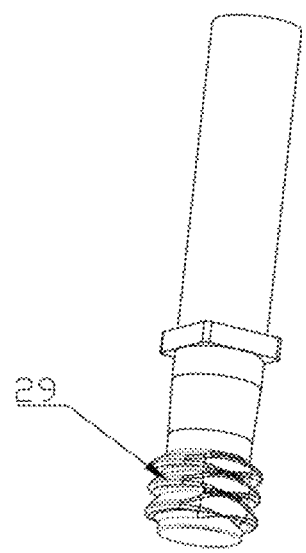
FIG. 3 is a schematic structural diagram of a screw rod.
Figure 4:
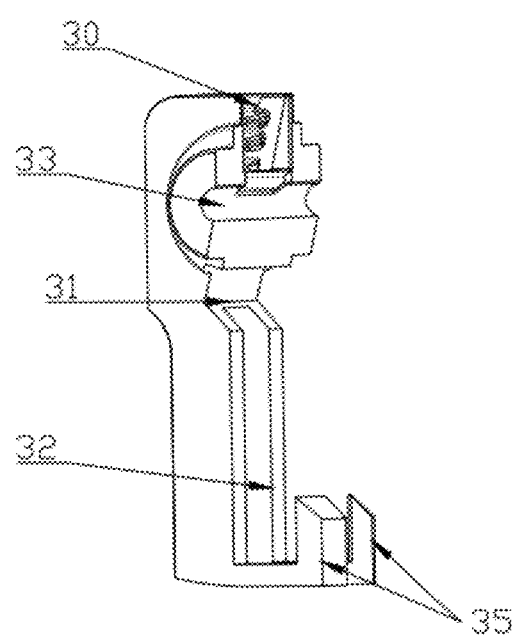
FIG. 4 is a schematic structural diagram of a limiting sleeve I.
Figure 5:
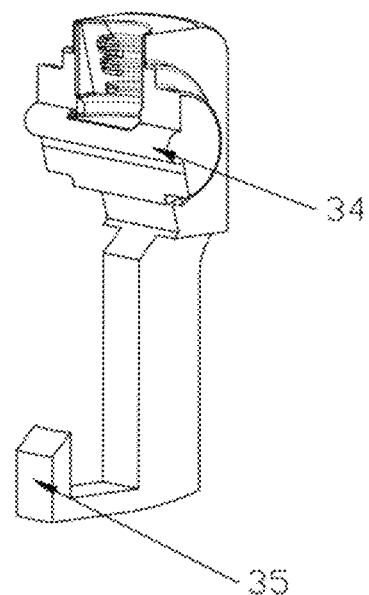
FIG. 5 is a schematic structural diagram of a limiting sleeve II.
Figure 6:
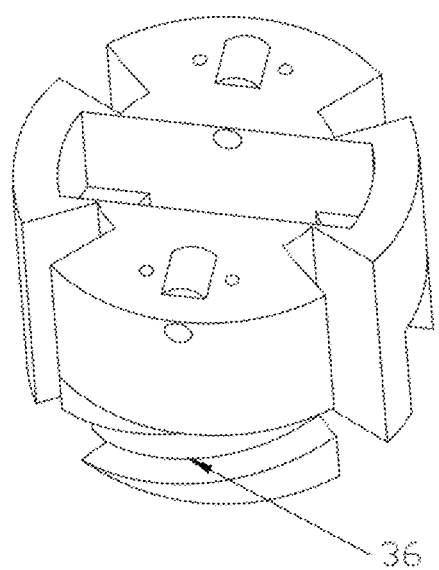
FIG. 6 is a schematic structural diagram of a lock pin.
Figure 7:
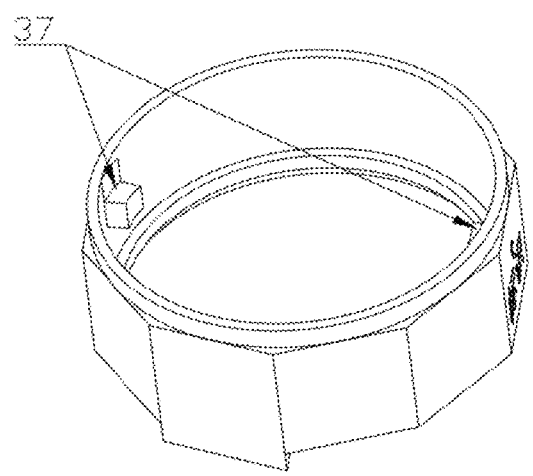
FIG. 7 is a schematic structural diagram of a rotating sleeve.

As shown in FIG. 1 to FIG. 7, a connection and separation device driven by memory alloy wires includes an active end and a passive end. The active end is connected to a system through a housing 10, and the passive end is connected to another system through a separation element 7. The active end includes a housing 10, an outer sleeve 22, fixed sheets 11, compression springs 12, a rotating sleeve 15, a base 16, memory alloy wires 20, guide wheels 21, a lock pin 23, a limiting sleeve I 26 and a limiting sleeve II 27;

the outer sleeve 22 is fixedly arranged in the housing 10 coaxially, the limiting sleeve I 26, the limiting sleeve II 27, the fixed sheets 11, the guide wheels 21 and the lock pin 23 are all arranged in the outer sleeve 22, the limiting sleeve I 26 and the limiting sleeve II 27 are arranged at the middle part of the outer sleeve 22, and the openings of the limiting sleeve I 26 and the limiting sleeve II 27 are arranged relative to each other to enclose an accommodating space; a fixed sheet 11 is fixedly arranged on each of two sides of the outer sleeve 22, a guide wheel 21 is installed on each fixed sheet 11 through a pin shaft, and a connecting line of center shafts of the two guide wheels 21 is perpendicular to a connecting line of the limiting sleeve I 26 and the limiting sleeve II 27 spatially; the top of the lock pin 23 extends into the outer sleeve 22 from the bottom end of the outer sleeve 22, and the lock pin 23 is slidably arranged in the outer sleeve 22; the bottom ends of the limiting sleeve I 26 and the limiting sleeve II 27 extend into a through hole in the middle of the lock pin 23, and the lock pin 23 circumferentially restricts the lower parts of the limiting sleeve I 26 and the limiting sleeve II 27;

the base 16 is fixed at the bottom of the lock pin 23, a memory alloy wire 20 is wound on each guide wheel 21, and two ends of each memory alloy wire 20 pass through the lock pin 23 and then are fixed on the base 16; the lock pin 23 is sleeved with the rotating sleeve 15, the outer surface of the lock pin 23 is provided with a spiral groove 36, and correspondingly, the inner wall of the rotating sleeve 15 is provided with a protrusion 37 matched with the spiral groove 36; when the lock pin 23 moves up and down, the rotating sleeve 15 rotates forward and backward; a compression spring 12 is arranged between the upper surface of the lock pin 23 and a fixed sheet 11, and the compression springs 12 keep the lock pin 23 in a locked state;

the passive end includes a screw rod 1, a loading nut 4, a separation element 7 and an adaptor 8; the adaptor 8 is fixed on the separation element 7 coaxially, the upper end of the screw rod 1 is provided with a threaded section matched with the loading nut 4, the lower end of the screw rod 1 is provided with multi-layer oblique protrusions 29, and the multi-layer oblique protrusions 29 are arranged symmetrically along an axis of the screw rod 1; the multi-layer oblique protrusions 29 at the lower end of the screw rod 1 sequentially pass through a through hole at the center of the adaptor 8, a through hole at the upper end of the housing 10 and a through hole at the upper end of the outer sleeve 22, and then extend into the upper part of an accommodating space formed by the limiting sleeve I 26 and the limiting sleeve II 27; and the memory alloy wires 20 are shortened when being electrified, the base 16 and the lock pin 23 move up, the lock pin 23 releases the limit on the lower ends of the limiting sleeve I 26 and the limiting sleeve II 27, the limiting sleeve I 26 and the limiting sleeve II 27 rotate at the same time, the lower parts of the limiting sleeve I 26 and the limiting sleeve II 27 are folded, and the upper parts of the limiting sleeve I 26 and the limiting sleeve II 27 are opened and separated from the screw rod 1, so as to realize the separation of the active end and the passive end.

The accommodating space formed by the limiting sleeve I 26 and the limiting sleeve II 27 includes an oblique groove section 30 matched with the multi-layer oblique protrusions 29 at the tail end of the screw rod 1, a flaring groove section 31 and a straight groove section 32 sequentially from top to bottom, and the oblique groove section 30 and the flaring groove section 31 are separated through a rotating hinge; the rotating hinge is formed by mutual cooperation of a semi-circular groove 33 arranged on the limiting sleeve I 26 and a semi-circular protrusion 34 arranged on the limiting sleeve II 27; two limiting hooks 35 are arranged at the lower part of the limiting sleeve I 26 in parallel, a limiting hook is arranged at the lower part of the limiting sleeve II 27, and a gap for accommodating the limiting hook of the limiting sleeve II 27 is formed between the two limiting hooks of the limiting sleeve I 26; and the lock pin 23 limits the swing of the three limiting hooks 35.

An oblique block 14 is installed at the upper end of the lock pin 23 through an optical axis 13, the oblique block 14 is arranged in the space at the lower part of the rotating hinge of the limiting sleeve I 26 and the limiting sleeve II 27, and the optical axis 13 passes through the space at the lower part of the rotating hinge of the limiting sleeve I 26 and the limiting sleeve II 27.

A bottom cover 17 is installed below the base 16, the bottom cover 17 is in threaded connection with an electrical connector 25, a bottom sealing hood 18 is arranged on the bottom cover 17 and the rotating sleeve 15, and the bottom sealing hood 18 is in threaded connection with the lower end of the housing 10.

One end of each memory alloy wire 20 is fixed on the base 16 through a wiring terminal 24, and the two wiring terminals of the two memory alloy wires are both connected to the electrical connector 25 through electrical wires.

Two reeds 28 for enabling the limiting sleeve I 26 and the limiting sleeve II 27 to rotate are fixedly arranged on the outer sleeve 22, and each reed 28 is arranged on the outer side of the corresponding limiting sleeve.

A spherical pad 6 is arranged at the contact position of the adaptor 8 and the loading nut 4, and the spherical pad 6 is sleeved on the screw rod 1; a screw rod gasket 9 is sleeved on the screw rod at the bottom of the adaptor 8; and an upper sealing cover 5 is arranged on the adaptor 8 and the loading nut 4, and a sealing ring 2 is arranged on the circumferential contact surface of the upper sealing cover 5 and the loading nut 4.

The rotating sleeve 15 has a reset identification point, the housing 10 also has a reset identification point, and the rotating sleeve 15 can be rotated until the reset identification point on the rotating sleeve 15 coincides with the reset identification point on the housing 10, so as to reset the active end and the passive end.

A bottom sealing ring 19 is sleeved on the electrical connector 25 between the bottom cover 17 and the bottom sealing hood 18.

A thin nut 3 for preventing loosening is added to the upper part of the loading nut 4. The memory alloy wires 20 are one-way memory alloy wires which can be shortened after being electrified.

The lock pin 23, the guide wheels 21 and the bottom cover 17 are made of nylon materials, so as to ensure that the contact positions between the memory alloy wires 20 and the wiring terminals 24 are insulated.

Working processes of the disclosure:

1. Separation process:

The memory alloy wires 20 are shortened after being electrified and drive the bottom cover 17, the base 16, the lock pin 23 and the oblique block 14 to move up, the lower end of the lock pin 23 can simultaneously release the restriction on the limiting hooks 35 at the lower parts of the limiting sleeve I 26 and the limiting sleeve II 27, when the oblique block 14 moves up to the flaring groove section 31 formed by the limiting sleeve I 26 and the limiting sleeve II 27, the pre-tightening force on the screw rod 1 acts on the limiting sleeve I 26 and the limiting sleeve II 27 through the multi-layer oblique protrusions 29, and at the same time, with the aid of the reeds 28 on both sides, the limiting sleeve I 26 and the limiting sleeve II 27 can rotate around the rotating hinge formed by the semi-circular protrusion 34 and the semi-circular groove 33, that is, the lower parts of the limiting sleeve I 26 and the limiting sleeve II 27 are folded, and the upper parts of the limiting sleeve I 26 and the limiting sleeve II 27 are opened and separated from the screw rod 1, so that the passive end can be transferred with a separation system.

2. Resetting process:

As the lock pin 23 moves up in the separation process, under the corresponding action of two spiral grooves 36 on the outer side of the lock pin 23 and the protrusions 37 on the rotating sleeve 15, the rotating sleeve 15 has been rotated forward. During resetting, the passive end is released, the screw rod 1 is put into the oblique groove section 31 at the upper parts of the limiting sleeve I 26 and the limiting sleeve II 27, the rotating sleeve 15 is rotated reversely, as the rotating sleeve 15 rotates, the lock pin 23 moves down to drive the oblique block 14 to move down, the upper parts of the limiting sleeve I 26 and the limiting sleeve II 27 are closed and are in contact with the multi-layer oblique protrusions 29 on the screw rod 1, the memory alloy wires 20 are stretched back to the original length, the rotating sleeve 15 is rotated reversely until the reset identification point coincides with the identification point on the housing 10 so as to complete the resetting action, a torque is applied to the loading nut 4, the screw rod 1 generates an axial pre-tightening force, and under the restriction of the inner wall of the lock pin 23 and the oblique block 14, the reset lower ends of the limiting sleeve I 26 and the limiting sleeve II 27 cannot be opened and cannot drive the lock pin 23 to move, so that the reliability of the locked state is increased.

The above examples are merely preferred examples of the disclosure and are not intended to limit the disclosure. Any modification, equivalent replacement and improvement made and the like within the spirit and principle of the disclosure are intended to be included within the protection scope of the disclosure.

What is claimed is:

1. A connection and separation device, comprising an active end and a passive end, wherein the active end comprises a housing (10), an outer sleeve (22), fixed sheets (11), compression springs (12), a rotating sleeve (15), a base (16), memory alloy wires (20), guide wheels (21), a lock pin (23), a limiting sleeve I (26) and a limiting sleeve II (27), and the connection and separation device is driven by the memory alloy wires;

the outer sleeve (22) is fixedly arranged in the housing (10) coaxially, the limiting sleeve I (26), the limiting sleeve II (27), the fixed sheets (11), the guide wheels (21) and the lock pin (23) are all arranged in the outer sleeve (22), the limiting sleeve I (26) and the limiting sleeve II (27) are arranged at a middle part of the outer sleeve (22), and openings of the limiting sleeve I (26) and the limiting sleeve II (27) are arranged relative to each other to enclose an accommodating space; the fixed sheets (11) are fixedly arranged on each of two sides of the outer sleeve (22), a guide wheel (21) is installed on each of the fixed sheets (11) through a pin shaft, and a connecting line of center shafts of the two guide wheels (21) is perpendicular to a connecting line of the limiting sleeve I (26) and the limiting sleeve II (27) spatially; a top part of the lock pin (23) extends into the outer sleeve (22) from a bottom end of the outer sleeve (22), and the lock pin (23) is slidably arranged in the outer sleeve (22); bottom ends of the limiting sleeve I (26) and the limiting sleeve II (27) extend into a through hole in a middle part of the lock pin (23), and the lock pin (23) circumferentially restricts lower parts of the limiting sleeve I (26) and the limiting sleeve II (27);

the base (16) is fixed at a bottom part of the lock pin (23), a memory alloy wire (20) is wound on each guide wheel (21), and two ends of each memory alloy wire (20) pass through the lock pin (23) and then are fixed on the base (16); the lock pin (23) is sleeved with the rotating sleeve (15), an outer surface of the lock pin (23) is provided with a spiral groove, and correspondingly, an inner wall of the rotating sleeve (15) is provided with a protrusion matched with the spiral groove; when the lock pin (23) moves up and down, the rotating sleeve (15) rotates forward and backward; each of the compression springs (12) is arranged between an upper surface of the lock pin (23) and the corresponding fixed sheet (11), and the compression springs (12) keep the lock pin (23) in a locked state;

the passive end comprises a screw rod (1), a loading nut (4), a separation element (7) and an adaptor (8); the adaptor (8) is fixed on the separation element (7) coaxially, an upper end of the screw rod (1) is provided with a threaded section matched with the loading nut (4), a lower end of the screw rod (1) is provided with multi-layer oblique protrusions (29), and the multi-layer oblique protrusions (29) are arranged symmetrically along an axis of the screw rod (1); the multi-layer oblique protrusions (29) at the lower end of the screw rod (1) sequentially pass through a through hole at a center of the adaptor (8), a through hole at an upper end of the housing (10) and a through hole at an upper end of the outer sleeve (22), and then extend into an upper part of an accommodating space formed by the limiting sleeve I (26) and the limiting sleeve II (27); and the memory alloy wires (20) are shortened when being electrified, the base (16) and the lock pin (23) move up, the lock pin (23) releases limit on lower ends of the limiting sleeve I (26) and the limiting sleeve II (27), the limiting sleeve I (26) and the limiting sleeve II (27) rotate at the same time, lower parts of the limiting sleeve I (26) and the limiting sleeve II (27) are folded, and upper parts of the limiting sleeve I (26) and the limiting sleeve II (27) are opened and separated from the screw rod (1), so as to realize separation of the active end and the passive end.

2. The connection and separation device according to claim 1, wherein the accommodating space formed by the limiting sleeve I (26) and the limiting sleeve II (27) comprises an oblique groove section (30) matched with the multi-layer oblique protrusions (29) at a tail end of the screw rod (1), a flaring groove section (31) and a straight groove section (32) sequentially from top to bottom, and the oblique groove section (30) and the flaring groove section (31) are separated through a rotating hinge; the rotating hinge is formed by mutual cooperation of a semi-circular groove (33) arranged on the limiting sleeve I (26) and a semi-circular protrusion (34) arranged on the limiting sleeve II (27); two limiting hooks (35) are arranged at the lower part of the limiting sleeve I (26) in parallel, a limiting hook is arranged at the lower part of the limiting sleeve II (27), and a gap for accommodating the limiting hook of the limiting sleeve II (27) is formed between the two limiting hooks of the limiting sleeve I (26); and the lock pin (23) limits swing of the three limiting hooks (35).

3. The connection and separation device according to claim 2, wherein an oblique block (14) is installed at an upper end of the lock pin (23) through an optical axis (13), the oblique block (14) is arranged in a space at a lower part of a rotating hinge of the limiting sleeve I (26) and the limiting sleeve II (27), and the optical axis (13) passes through the space at the lower part of the rotating hinge of the limiting sleeve I (26) and the limiting sleeve II (27).

4. The connection and separation device according to claim 1, wherein a bottom cover (17) is installed below the base (16), the bottom cover (17) is in threaded connection with an electrical connector (25), a bottom sealing hood (18) is arranged on the bottom cover (17) and the rotating sleeve (15), and the bottom sealing hood (18) is in threaded connection with a lower end of the housing (10).

5. The connection and separation device according to claim 4, wherein one end of each memory alloy wire (20) is fixed on the base (16) through a wiring terminal (24), and the two wiring terminals of the two memory alloy wires are both connected to the electrical connector (25) through electrical wires.

6. The connection and separation device according to claim 4, wherein a bottom sealing ring (19) is sleeved on the electrical connector (25) between the bottom cover (17) and the bottom sealing hood (18).

7. The connection and separation device according to claim 1, wherein two reeds (28) for enabling the limiting sleeve I (26) and the limiting sleeve II (27) to rotate are fixedly arranged on the outer sleeve (22), and each reed (28) is arranged on an outer side of a corresponding limiting sleeve.

8. The connection and separation device according to claim 1, wherein a spherical pad (6) is arranged at a contact position of the adaptor (8) and the loading nut (4), and the spherical pad (6) is sleeved on the screw rod (1); a screw rod gasket (9) is sleeved on the screw rod at a bottom part of the adaptor (8); and an upper sealing cover (5) is arranged on the adaptor (8) and the loading nut (4), and a sealing ring (2) is arranged on a circumferential contact surface of the upper sealing cover (5) and the loading nut Lt.

9. The connection and separation device according to claim 1, wherein the rotating sleeve (15) has a reset identification point, the housing (10) also has a reset identification point, and the rotating sleeve (15) is rotated until the reset identification point on the rotating sleeve (15) coincides with the reset identification point on the housing (10), so as to reset the active end and the passive end.

10. The connection and separation device according to claim 1, wherein a thin nut (3) for preventing loosening is added to an upper part of the loading nut (4).

\* \* \* \* \*